(12) United States Patent
Nishimura

(10) Patent No.: US 8,519,591 B2
(45) Date of Patent: Aug. 27, 2013

(54) DYNAMOELECTRIC MACHINE THAT INCREASES AN OUTPUT FROM A RECTIFIER AT LOW SPEED ROTATION

(75) Inventor: Shinji Nishimura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 791 days.

(21) Appl. No.: 12/615,427

(22) Filed: Nov. 10, 2009

(65) Prior Publication Data

US 2010/0320863 A1 Dec. 23, 2010

(30) Foreign Application Priority Data

Jun. 19, 2009 (JP) .................................. 2009-146410

(51) Int. Cl.
*H02K 1/00* (2006.01)
(52) U.S. Cl.
USPC .......................................... 310/198; 310/184
(58) Field of Classification Search
USPC .................................................. 310/198, 184
See application file for complete search history.

(56) References Cited

U.S. PATENT DOCUMENTS

| | | | | | |
|---|---|---|---|---|---|
| 1,711,979 | A | * | 5/1929 | Weinert | 310/202 |
| 4,307,311 | A | * | 12/1981 | Grozinger | 310/179 |
| 5,122,705 | A | * | 6/1992 | Kusase et al. | 310/68 D |
| 5,691,590 | A | * | 11/1997 | Kawai et al. | 310/180 |
| 6,713,928 | B2 | * | 3/2004 | Takizawa et al. | 310/214 |
| 6,798,106 | B2 | * | 9/2004 | Nakamura et al. | 310/179 |
| 7,075,206 | B1 | * | 7/2006 | Chen | 310/179 |
| 2007/0278889 | A1 | * | 12/2007 | Sasaki et al. | 310/184 |
| 2008/0185933 | A1 | * | 8/2008 | Baba | 310/198 |
| 2010/0320863 | A1 | * | 12/2010 | Nishimura | 310/198 |

FOREIGN PATENT DOCUMENTS

| | | |
|---|---|---|
| JP | 04-105587 A | 4/1992 |
| JP | 2002-354731 A | 12/2002 |
| JP | 2003-209956 A | 7/2003 |
| JP | 2004-088880 A | 3/2004 |
| JP | 2008-193785 A | 8/2008 |
| JP | 2008-278567 A | 11/2008 |
| WO | 2007/077236 A1 | 7/2007 |

OTHER PUBLICATIONS machine translation of WO 2007/077236, "electric machine", Jul. 12, 2007, Wolf, Gert.*
Office Action issued in corresponding Japanese Patent Application No. 2011-27063 dated Feb. 14, 2012.
Office Action issued in corresponding Japanese Patent Application No. 2009-146410 dated Apr. 26, 2011.

* cited by examiner

Primary Examiner — Nguyen N Hanh
(74) Attorney, Agent, or Firm — Sughrue Mion, PLLC

(57) ABSTRACT

A dynamoelectric machine includes: a rotor that has 2n field poles, where n is a positive integer; and a stator including: a stator core in which 2n×6 slots that are partitioned by adjacent teeth are formed at a predetermined pitch circumferentially; and first and second three-phase alternating-current windings that are each configured by delta-connecting three phase windings that are mounted to the stator core such that an electrical angle phase difference therebetween is 120 degrees, each of the phase windings being configured by connecting in series pairs of coil winding portions that are mounted to the stator core so as to have different electrical angular phases from each other, and an electrical angle phase difference between the first and second three-phase alternating-current windings is 30 degrees.

7 Claims, 6 Drawing Sheets

DYNAMOELECTRIC MACHINE THAT INCREASES AN OUTPUT FROM A RECTIFIER AT LOW SPEED ROTATION

BACKGROUND OF THE INVENTION

1. Field of the Invention

The present invention relates to a dynamoelectric machine such as an alternator or a starter motor, etc., that is mounted to an automobile, for example.

2. Description of the Related Art

First conventional generators include: a rotor that has field poles; a stator that includes: a stator core in which slots that number six times the number of field poles are formed at a predetermined pitch circumferentially; and first and second three-phase alternating-current windings that are each configured by delta-connecting three phase windings that have been wound into the stator core such that an electrical angle phase difference therebetween is 120 degrees; a rectifier that rectifies alternating-current output that is induced in the first and second three-phase alternating-current windings due to rotation of the rotor, which rotates synchronously with rotation of an engine; and a storage battery that is charged by rectified output from the rectifier, each of the phase windings being configured by connecting in series coil winding portions that have been wound into the stator core so as to have different electrical angular phases therebetween (see Patent Literature 1, for example).

Patent Literature 1: WO/2007/077236 (Pamphlet)

Hereinafter, three-phase alternating-current windings in which respective phase windings are configured by connecting in series two coil winding portions that have different electrical angular phases from each other, and that are configured by delta-connecting three phase windings such that the electrical angle phase difference between each is 120 degrees shall be designated "zigzag delta windings". Furthermore, in the zigzag delta windings, three-phase alternating-current windings that are configured by rewinding the two coil winding portions that constitute each of the phase windings so as to be connected in series with matching electrical angular phase shall be designated "normal delta windings". Moreover, generators that use normal delta windings in the first and second three-phase alternating-current windings are conventionally well known, and generators that use normal delta windings in the first and second three-phase alternating-current windings shall be designated "second conventional generators".

In first conventional generators that use zigzag delta windings, because electromotive force phases of the two coil winding portions that constitute each of the phase windings are offset from each other, it is generally acknowledged that compound electromotive forces from the phase windings are reduced compared to electromotive forces from phase windings in second conventional generators that use normal delta windings. It is also known that armature reaction is less in the first conventional generators than in the second conventional generators.

When the relationship between offset of the electromagnetic force phases of the phase windings of the first conventional generators and magnitudes of armature reaction in the first and second conventional generators is considered, it is conventionally known that output from the rectifier (electric current) is reduced in the first conventional generators compared with the second conventional generators in a region in which the rotor rotates at low speed, and output from the rectifier is increased in a region in which the rotor rotates at high speed.

If the first and second conventional generators are used for automotive use, output from the rectifier increases as rotational speed (angular speed) of the rotor, which is synchronized with the rotation of the engine, increases until the rotational speed reaches a predetermined magnitude, but when the rotational speed of the rotor becomes higher than a predetermined speed, output from the rectifier is practically saturated.

If a vehicle is running at or above a predetermined speed, for example, the storage battery that is charged by the rectified output from the rectifier can supply sufficient electric power to drive items of electrical equipment that are being used in the vehicle because the rotor rotates at high speed. On the other hand, if the engine is rotating at low speed, such as when the engine is in an idling state, etc., output from the rectifier is small because rotation of the rotor is also at low speed. Because output from the rectifier in the first conventional generators in particular is lower than the output from the second conventional generators when the rotor rotates at low speed, there has been a risk that the storage battery may be flattened if the rotational speed of the rotor remains low.

It is possible that output from the rectifier could be increased even when the rotor rotates at low speed by increasing the number of turns in the phase windings to increase the electromotive force from the phase windings, but in that case resistance in the phase windings is increased and generating efficiency is reduced.

As a result of persistent diligent effort to solve these problems, the present applicants have found that output from a rectifier in a generator that uses zigzag delta windings can be increased when a rotor is rotating at low speed without having to increase the number of turns in the phase windings by setting the electrical angle phase difference between the first and second three-phase alternating-current windings appropriately, and have invented the present invention.

SUMMARY OF THE INVENTION

The present invention aims to solve the above problems and an object of the present invention is to provide a dynamoelectric machine that can increase output from a rectifier even when a rotor rotates at low speed without lowering generating efficiency, by setting an electrical angle phase difference between first and second three-phase alternating-current windings to an appropriate value.

In order to achieve the above object, according to one aspect of the present invention, there is provided a dynamoelectric machine including: a rotor that has 2n field poles, where n is a positive integer; a stator including: a stator core in which 2n×6 slots that are partitioned by adjacent teeth are formed at a predetermined pitch circumferentially; and first and second three-phase alternating-current windings that are each configured by delta-connecting three phase windings that are mounted to the stator core such that an electrical angle phase difference therebetween is 120 degrees; and a rectifier that rectifies alternating-current output that is induced in the first and second three-phase alternating-current windings due to rotation of the rotor. Each of the phase windings is configured by connecting in series pairs of coil winding portions that are mounted to the stator core so as to have different electrical angular phases from each other, and an electrical angle phase difference between the first and second three-phase alternating-current windings is 30 degrees.

In a dynamoelectric machine according to the present invention, first and second three-phase alternating-current windings are each configured by delta-connecting three phase windings such that electrical angle phases differ by 120 degrees therebetween, the three phase windings being constituted by coil winding portions that are mounted into a stator core so as to have different electrical angular phases therebetween and that are connected in series, and in addition an electrical angle phase difference between the first and second three-phase alternating-current windings is 30 degrees.

The dynamoelectric machine according to the present invention can thereby increase output from the rectifier when the rotor rotates at low speed compared with first conventional generators, without increasing the number of turns in the phase windings, in other words, without inviting reductions in generating efficiency due to increases in resistance in the phase windings.

DETAILED DESCRIPTION OF THE PREFERRED EMBODIMENTS

Preferred embodiments of the present invention will now be explained with reference to the drawings.

Embodiment 1

Figure 1:
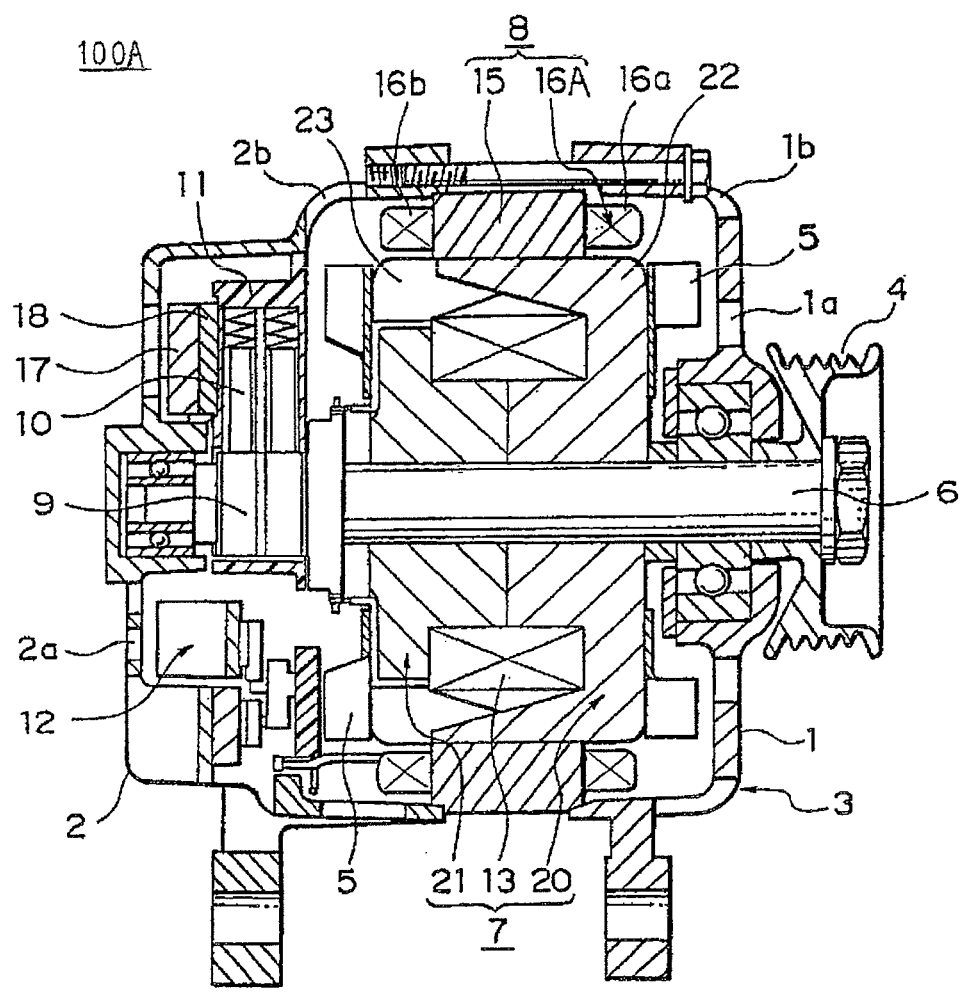
FIG. 1 is a longitudinal section that shows a configuration of an automotive alternator according to Embodiment 1 of the present invention.
Figure 2:
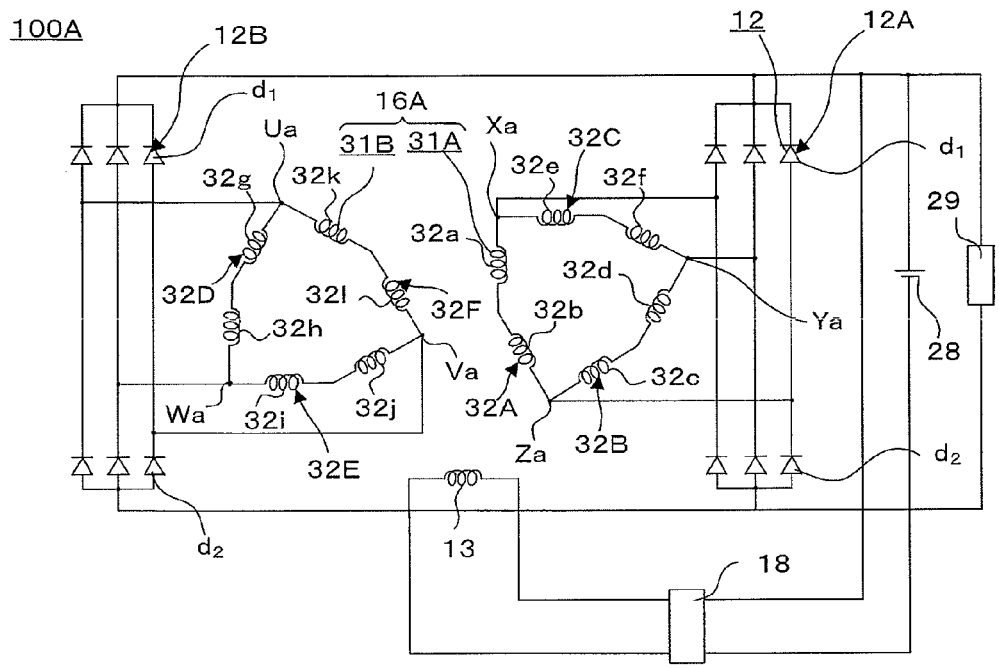
FIG. 2 is a circuit diagram of the automotive alternator according to Embodiment 1 of the present invention.
Figure 3:
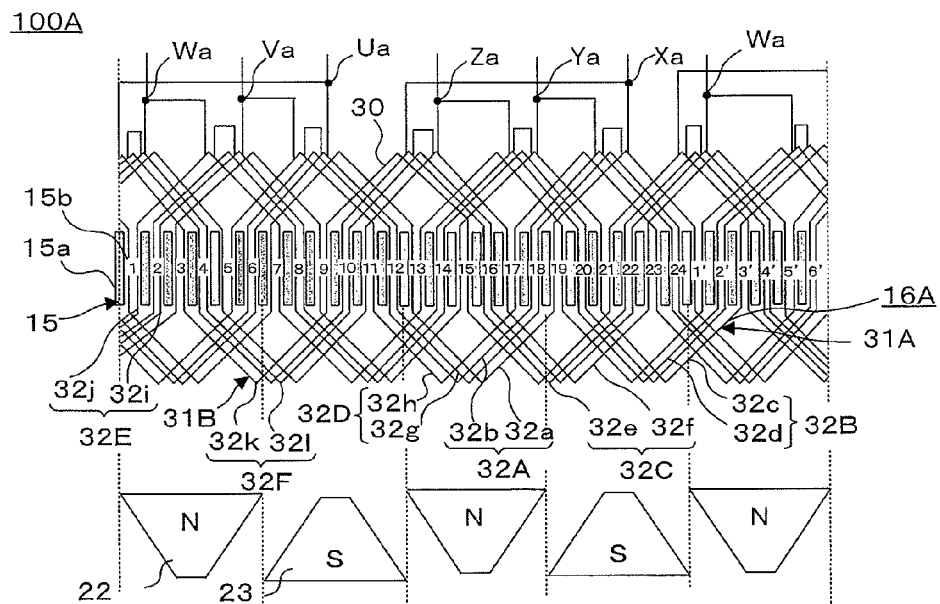
FIG. 3 is a developed projection that explains a configuration of an armature winding in the automotive alternator according to Embodiment 1 of the present invention.

FIG. 1 is a longitudinal section that shows a configuration of an automotive alternator according to Embodiment 1 of the present invention, FIG. 2 is a circuit diagram of the automotive alternator according to Embodiment 1 of the present invention, and FIG. 3 is a developed projection that explains a configuration of an armature winding in the automotive alternator according to Embodiment 1 of the present invention.

In FIGS. 1 and 2, an automotive alternator 100A that functions as a dynamoelectric machine includes: a Lundell rotor 7 that is mounted rotatably by means of a shaft 6 inside a case 3 that is constituted by a front bracket 1 and a rear bracket 2 that are made of aluminum; a stator 8 that is fixed to an inner wall surface of the case 3 so as to cover an outer circumferential side of the rotor 7; and a rectifier 12 that rectifies alternating-current output that is generated in the stator 8 into direct-current output.

The shaft 6 is supported by the front bracket 1 and the rear bracket 2 so as to be rotatable around an axis. A pulley 4 is fixed to a first end of the shaft 6 such that rotational torque from an engine of a vehicle can be transmitted to the shaft 6 by means of a belt (not shown). The shaft 6 rotates synchronously with the rotation of the engine. Thus, the rotor 7 also rotates synchronously with the rotation of the engine. Slip rings 9 that supply electric current to the rotor 7 are fixed to a second end portion of the shaft 6, and a pair of brushes 10 are housed in a brush holder 11 that is disposed inside the case 3 so as to slide in contact with the slip rings 9. A voltage regulator 18 that adjusts magnitude of an alternating-current voltage that is generated in the stator 8 is fixed adhesively to a heat sink 17 that is fitted into the brush holder 11.

The rectifier 12 is constituted by first and second three-phase full-wave rectifiers 12A and 12B. Each of the three-phase full-wave rectifiers 12A and 12B is configured by connecting in parallel three diode pairs that are formed by connecting in series a positive-side diode $d_1$ and a negative-side diode $d_2$ as shown in FIG. 2, and is mounted inside the case 3.

The rotor 7 is constituted by: a field winding 13 that generates magnetic flux on passage of electric current; and first and second pole cores 20 and 21 that are disposed so as to cover the field winding 13, and in which magnetic poles are formed by the magnetic flux that is generated by the field winding 13. The first and second pole cores 20 and 21 are made of iron, respectively have first and second claw-shaped magnetic poles 22 and 23 disposed so as to project at a uniform angular pitch circumferentially on outer circumferential edges thereof, and are fixed to the shaft 6 so as to face each other so as to intermesh the first and second claw-shaped magnetic poles 22 and 23. Moreover, the first and second claw-shaped magnetic poles 22 and 23 correspond to field poles. Because the field poles are mounted in the shaft 6 that synchronizes with the rotation of the engine, rotating magnetic fields are generated synchronously with the rotation of the engine.

The stator 8 includes: a stator core 15; and an armature winding 16A that is mounted to the stator core 15. The armature winding 16A includes first and second three-phase alternating-current windings 31A and 31B that are each constituted by zigzag delta windings mentioned above, and are configured such that electrical angular phases differ by 30 degrees between the first and second three-phase alternating-current windings 31A and 31B.

The first three-phase alternating-current winding 31A is configured by delta-connecting three phase windings (a-phase winding 32A through c-phase winding 32C) that are mounted to the stator core 15 such that electrical angle phase differences therebetween are 120 degrees. The a-phase winding 32A through c-phase winding 32C are configured by connecting in series respective pairs of coil winding portions 32a and 32b, 32c and 32d, and 32e and 32f that are mounted to the stator core 15 such that their electrical angular phases differ by 30 degrees from each other.

The second three-phase alternating-current winding 31B is configured by delta-connecting three phase windings (a-phase winding 32D through c-phase winding 32F) that are mounted to the stator core 15 such that electrical angle phase differences therebetween is 120 degrees. The a-phase winding 32D through c-phase winding 32F are configured by connecting in series respective pairs of coil winding portions 32g and 32h, 32i and 32j, and 32k and 32l that are mounted to the stator core 15 such that their electrical angular phases differ by 30 degrees from each other.

Connection wiring portions Xa, Ya, and Za of the three phase windings of the first three-phase alternating-current winding 31A are each connected to connected portions between the positive-side diode $d_1$ and the negative-side diode $d_2$ of the first three-phase full-wave rectifier 12A. Connection wiring portions Ua, Va, and Wa of the three phase windings of the second three-phase alternating-current winding 31B are each connected to connected portions between the positive-side diode $d_1$ and the negative-side diode $d_2$ of the second three-phase full-wave rectifier 12B.

Fans 5 (internal fans) are fixed to first and second axial ends of the rotor 7. Air intake apertures 1a and 2a are disposed on axial end surfaces of the front bracket 1 and the rear bracket 2, and air discharge apertures 1b and 2b are disposed on portions of the front bracket 1 and the rear bracket 2 in vicinities of front-end and rear-end coil end groups 16a and 16b of the armature winding 16A. Output from the rectifier 12 is supplied to a storage battery 28 and an electric load 29.

Next, a winding construction of the armature winding 16A will be explained with reference to FIGS. 2 and 3.

To facilitate explanation, positions of the first and second claw-shaped magnetic poles 22 and 23 are depicted in FIG. 3 so as to be offset in an axial direction of the stator core 15.

The stator core 15 is prepared into a cylindrical laminated core that has: a plurality of teeth 15a that are formed so as to extend radially at a uniform angular pitch circumferentially; and slots 15b that are partitioned between adjacent teeth 15a. The number of teeth 15a and slots 15b is set to a number that satisfies a condition of being six times the number of field poles. Here, to facilitate explanation, the number of field poles is explained as being four, but in reality the number of field poles is sixteen.

In FIG. 3, 1 through 24 represent slot numbers. In order to make the winding construction of the armature winding 16A easier to understand, the slots 15b at Numbers 1 through 6 are depicted as being renumbered Numbers 1' through 6' to the right of the slot 15b at Number 24, but in reality the slot 15b at Number 24 is adjacent to the slot 15b at Number 1. Here, because twenty-four slots 15b are formed relative to four field poles (two pairs of North-seeking (N) poles and South-seeking (S) poles), the number of slots per one field pole is six, and the slots 15b are arranged at a pitch that corresponds to an electrical angle of 30 degrees.

First, the winding construction of the first three-phase alternating-current winding 31A that is constituted by the a-phase winding 32A through c-phase winding 32C will be explained.

The a-phase winding 32A is constituted by the coil winding portion 32a and the coil winding portion 32b. The b-phase winding 32B is constituted by the coil winding portion 32c and the coil winding portion 32d. The c-phase winding 32C is constituted by the coil winding portion 32e and the coil winding portion 32f.

The coil winding portions 32a through 32f are configured by mounting into the stator core 15 conducting wires 30 that are prepared using a copper wire that has a circular cross section that has been coated with an insulator, as will be explained below.

First, the winding construction of the a-phase winding 32A will be explained.

The conducting wire 30 of the coil winding portion 32a first passes from a rear end of the stator core 15 (hereinafter simply "the rear end") through the slot 15b at Number 1, extends outward at a front end of the stator core 15 (hereinafter simply "the front end"), and is folded back. In addition, the conducting wire 30 passes through the slot 15b at Number 7, extends outward at the rear end and is folded back, subsequently passes through the slot 15b at Number 13 and is extended outward at the front end, and finally passes through the slot 15b at Number 19, is extended outward at the rear end and returns to the slot 15b at Number 1. The conducting wire 30 is mounted to the stator core 15 so as to make three laps by being inserted into a slot group that is constituted by the slots 15b at Numbers 1, 7, 13, and 19 in this manner.

The conducting wire 30 of the coil winding portion 32b first passes from the rear end through the slot 15b at Number 24, extends outward at the front end of the stator core 15, and is folded back. In addition, the conducting wire 30 passes through the slot 15b at Number 6, extends outward at the rear end and is folded back, subsequently passes through the slot 15b at Number 12 and is extended outward at the front end, and finally passes through the slot 15b at Number 18, is extended outward at the rear end and returns to the slot 15b at Number 24. The conducting wire 30 is mounted to the stator core 15 so as to make three laps by being inserted into a slot group that is constituted by the slots 15b at Numbers 6, 12, 18, and 24 in this manner.

The a-phase winding 32A is configured by connecting an end portion of the coil winding portion 32a that extends out from the slot 15b at Number 19 and an end portion of the coil winding portion 32b that extends out from the slot 15b at Number 24. In other words, the a-phase winding 32A is configured by connecting in series a pair of coil winding portions 32a and 32b between which an electrical angle phase difference is 30 degrees.

Next, the winding construction of the b-phase winding 32B will be explained.

The conducting wire 30 of the coil winding portion 32c first passes from the rear end through the slot 15b at Number 21, extends outward at the front end of the stator core 15, and is folded back. In addition, the conducting wire 30 passes through the slot 15b at Number 3, extends outward at the rear end and is folded back, subsequently passes through the slot 15b at Number 9 and is extended outward at the front end, and finally passes through the slot 15b at Number 15, is extended outward at the rear end and returns to the slot 15b at Number 21. The conducting wire 30 is mounted to the stator core 15 so as to make three laps by being inserted into a slot group that is constituted by the slots 15b at Numbers 3, 9, 15, and 21 in this manner.

The conducting wire 30 of the coil winding portion 32d first passes from the rear end through the slot 15b at Number 20, extends outward at the front end of the stator core 15, and is folded back. In addition, the conducting wire 30 passes through the slot 15b at Number 2, extends outward at the rear end and is folded back, subsequently passes through the slot 15b at Number 8 and is extended outward at the front end, and finally passes through the slot 15b at Number 14, is extended outward at the rear end and returns to the slot 15b at Number 20. The conducting wire 30 is mounted to the stator core 15 so as to make three laps by being inserted into a slot group that is constituted by the slots 15b at Numbers 2, 8, 14, and 20 in this manner.

The b-phase winding 32B is configured by connecting an end portion of the coil winding portion 32c that extends out from the slot 15b at Number 15 and an end portion of the coil winding portion 32d that extends out from the slot 15b at Number 20. In other words, the b-phase winding 32B is configured by connecting in series a pair of coil winding portions 32c and 32d between which an electrical angle phase difference is 30 degrees.

Next, the winding construction of the c-phase winding 32C will be explained.

The conducting wire 30 of the coil winding portion 32e first passes from the rear end through the slot 15b at Number 17, extends outward at the front end of the stator core 15, and is folded back. In addition, the conducting wire 30 passes through the slot 15b at Number 23, extends outward at the rear end and is folded back, subsequently passes through the slot 15*b* at Number 5 and is extended outward at the front end, and finally passes through the slot 15*b* at Number 11, is extended outward at the rear end and returns to the slot 15*b* at Number 17. The conducting wire 30 is mounted to the stator core 15 so as to make three laps by being inserted into a slot group that is constituted by the slots 15*b* at Numbers 5, 11, 17, and 23 in this manner.

The conducting wire 30 of the coil winding portion 32*f* first passes from the rear end through the slot 15*b* at Number 16, extends outward at the front end of the stator core 15, and is folded back. In addition, the conducting wire 30 passes through the slot 15*b* at Number 22, extends outward at the rear end and is folded back, subsequently passes through the slot 15*b* at Number 4 and is extended outward at the front end, and finally passes through the slot 15*b* at Number 10, is extended outward at the rear end and returns to the slot 15*b* at Number 16. The conducting wire 30 is mounted to the stator core 15 so as to make three laps by being inserted into a slot group that is constituted by the slots 15*b* at Numbers 4, 10, 16, and 22 in this manner.

The c-phase winding 32C is configured by connecting an end portion of the coil winding portion 32*e* that extends out from the slot 15*b* at Number 11 and an end portion of the coil winding portion 32*f* that extends out from the slot 15*b* at Number 16. In other words, the c-phase winding 32C is configured by connecting in series a pair of coil winding portions 32*e* and 32*f* between which an electrical angle phase difference is 30 degrees.

To summarize the a-phase winding 32A through c-phase winding 32C that have been described above, the respective coil winding portions 32*a* through 32*f* that constitute the a-phase winding 32A through c-phase winding 32C are configured by mounting conducting wires 30 into the stator core 15 in wave windings that have a pitch that is equal to the pitch of the field poles (full-pitch wave windings). Electrical angle phase differences between the pairs of coil winding portions 32*a* and 32*b*, 32*c* and 32*d*, and 32*e* and 32*f* that are connected in series are 30 degrees, and the number of turns in each of the coil winding portions 32*a* through 32*f* is equal.

Then, an end portion of the coil winding portion 32*a* of the a-phase winding 32A and an end portion of the coil winding portion 32*e* of the c-phase winding 32C, an end portion of the coil winding portion 32*b* of the a-phase winding 32A and an end portion of the coil winding portion 32*c* of the b-phase winding 32B, and an end portion of the coil winding portion 32*d* of the b-phase winding 32B and an end portion of the coil winding portion 32*f* of the c-phase winding 32C are respectively connected. Thus, the first three-phase alternating-current winding 31A is constituted by a zigzag delta winding. Moreover, a connection wiring portion between the a-phase winding 32A and the b-phase winding 32B, a connection wiring portion between the b-phase winding 32B and the c-phase winding 32C, and a connection wiring portion between the a-phase winding 32A and the c-phase winding 32C constitute a connection wiring portion Za, a connection wiring portion Ya, and a connection wiring portion Xa, respectively.

Next, the winding construction of the second three-phase alternating-current winding 31B that is constituted by the a-phase winding 32D through c-phase winding 32F will be explained.

The a-phase winding 32D is configured by connecting in series the coil winding portion 32*g* and the coil winding portion 32*h*. The b-phase winding 32E is configured by connecting in series the coil winding portion 32*i* and the coil winding portion 32*j*. The c-phase winding 32F is configured by connecting in series the coil winding portion 32*k* and the coil winding portion 32*l*.

The coil winding portions 32*g* through 32*l* are configured by mounting into the stator core 15 conducting wires 30 that are prepared using a copper wire that has a circular cross section that has been coated with an insulator as full-pitch wave windings, as will be explained below.

The coil winding portions 32*g* through 32*l* are configured as if the coil winding portion 32*a* through 32*f* that constitute the a-phase winding 32A through c-phase winding 32C were mounted into the stator core 15 so as to be offset by eleven slots in a direction of progression of the numbers of the slot 15*b*. Here, the number that follows Number 24 is Number 1.

Then, an end portion of the coil winding portion 32*g* of the a-phase winding 32D and an end portion of the coil winding portion 32*k* of the c-phase winding 32F, an end portion of the coil winding portion 32*h* of the a-phase winding 32D and an end portion of the coil winding portion 32*i* of the b-phase winding 32E, and an end portion of the coil winding portion 32*j* of the b-phase winding 32E and an end portion of the coil winding portion 32*l* of the c-phase winding 32F are respectively connected. Thus, the second three-phase alternating-current winding 31B is constituted by a zigzag delta winding. Moreover, a connection wiring portion between the a-phase winding 32D and the c-phase winding 32F, a connection wiring portion between the b-phase winding 32E and the c-phase winding 32F, and a connection wiring portion between the a-phase winding 32D and the b-phase winding 32E constitute a connection wiring portion Ua, a connection wiring portion Va, and a connection wiring portion Wa, respectively.

Moreover, it goes without saying that electrical angle phase differences among the a-phase winding 32D through c-phase winding 32F of the second three-phase alternating-current winding 31B are 120 degrees in a similar manner to the a-phase winding 32A through c-phase winding 32C of the first three-phase alternating-current winding 31A.

Because the slots 15*b* are arranged at a pitch that corresponds to an electrical angle of 30 degrees, the electrical angle phase differences between the a-phase windings 32A and 32D, the b-phase windings 32B and 32E, and the c-phase winding 32C and 32F are each 30 degrees. In other words, the electrical angle phase difference between the first and second three-phase alternating-current windings 31A and 31B is 30 degrees.

The coil winding portions 32*a* through 32*l* of an armature winding 16A that has been configured as described above are mounted to slot groups as follows:

First, the six coil winding portions 32*a* through 32*f* that constitute the first three-phase alternating-current winding 31A are each mounted into six different slot groups. The six coil winding portions 31*g* through 32*l* that constitute the second three-phase alternating-current winding 31B are also each mounted to different slot groups. The pairs of coil winding portions that respectively constitute the a-phase winding 32A through c-phase winding 32C that constitute the first three-phase alternating-current winding 31A are each mounted into slot groups into which are mounted one coil winding portion that constitutes one phase winding that constitutes the second three-phase alternating-current winding 31B and one coil winding portion that constitutes another phase winding that constitutes the second three-phase alternating-current winding 31B.

In an automotive alternator 100A that is configured in this manner, an electric current is supplied from the storage battery 28 to the field winding 13 by means of the brushes 10 and the slip rings 9, generating magnetic flux. The first claw-shaped magnetic poles 22 on the first pole core 20 are magnetized into North-seeking (N) poles by this magnetic flux, and the second claw-shaped magnetic poles 23 on the second pole core 21 are magnetized into South-seeking (S) poles. At the same time, rotational torque from the engine is transmitted to the shaft 6 by means of the belt (not shown) and the pulley 4, rotating the rotor 7. Thus, rotating magnetic fields are applied to the armature winding 16A, generating alternating-current electromotive forces in the armature winding 16A. Alternating currents (alternating-current outputs) that are generated by these electromotive forces pass through the three-phase full-wave rectifiers 12A and 12B and are rectified into direct current, and the magnitude thereof is also adjusted by the voltage regulator 18, then charged to the storage battery 28 and supplied to the electric load 29.

Next, effects of an automotive alternator 100A that is characterized in that electrical angles of the first and second three-phase alternating-current windings 31A and 31B are offset by 30 degrees have been confirmed, and the contents thereof will now be explained in detail.

In an experiment, a first comparative alternator and a second comparative alternator that will be explained below were prepared, and output current from the rectifier 12 was measured as the rotational speed of the rotor 7 was changed in the automotive alternator 100A, the first comparative alternator, and the second comparative alternator, respectively. Moreover, the output current from the rectifier 12 was the sum of the output currents from the three-phase full-wave rectifiers 12A and 12B.

In a similar manner to the automotive alternator 100A, the number of field poles in the first comparative alternator and the second comparative alternator is explained as being four to facilitate explanation, but in reality configurations in which the number of field poles was sixteen were used.

Next, the first comparative alternator will be explained with reference to FIG. 4.

Figure 4:
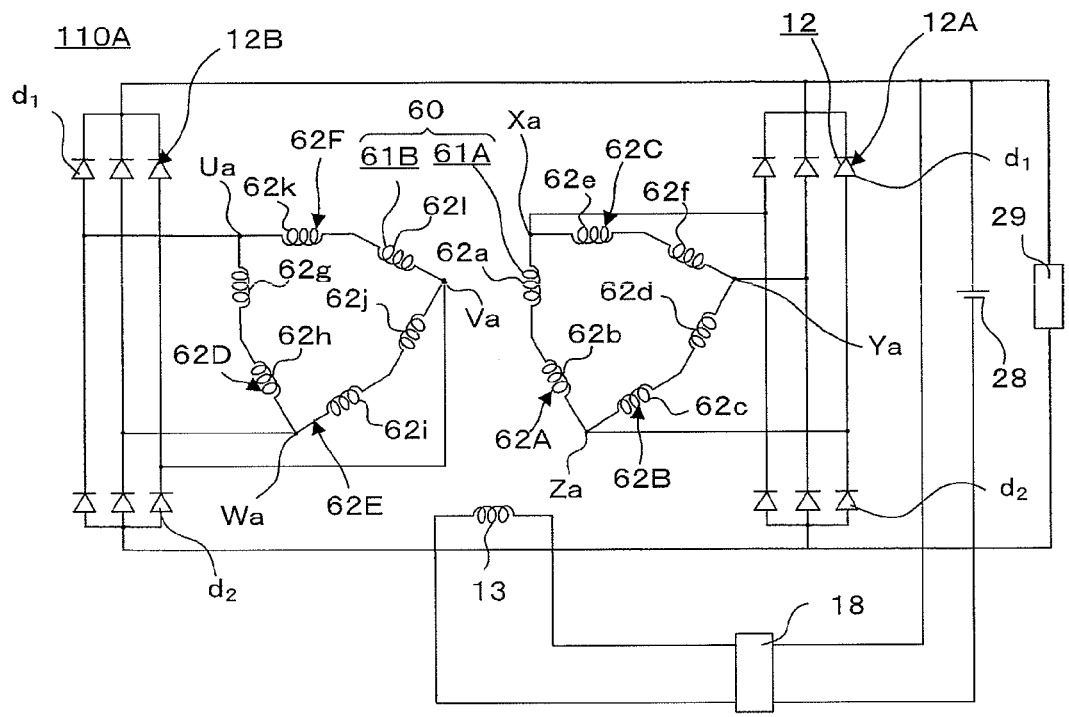
FIG. 4 is a circuit diagram of a first comparative alternator.

FIG. 4 is a circuit diagram of the first comparative alternator.

In FIG. 4, an armature winding 60 of the first comparative alternator 110A has first and second three-phase alternating-current windings 61A and 61B that are each constituted by a zigzag delta winding. An electrical angle phase difference between the first and second three-phase alternating-current windings 61A and 61B is set to 0 degrees.

An a-phase winding 62A through c-phase winding 62C that constitute the first three-phase alternating-current winding 61A are configured in a similar manner to the a-phase winding 32A through c-phase winding 32C of the first three-phase alternating-current winding 31A of the automotive alternator 100A. Moreover, coil winding portions 62a and 62b, 62c and 62d, and 62e and 62f that constitute the a-phase winding 62A through the c-phase winding 62C correspond to the coil winding portions 32a and 32b, 32c and 32d, and 32e and 32f.

An a-phase winding 62D through c-phase winding 62F that constitute the second three-phase alternating-current winding 61B are configured in a similar manner to the a-phase winding 62A through c-phase winding 62C, but the coil winding portions 62g and 62h, 62i and 62j, and 62k and 62l that constitute the a-phase winding 62D through c-phase winding 62F are mounted to a stator core (not shown) so as to pass through slots that have identical numbers to the numbers of the slots (not shown) through which the coil winding portions 62a and 62b, 62c and 62d, and 62e and 62f pass.

The rest of the configuration of the first comparative alternator 110A is similar to that of the automotive alternator 100A.

Next, the second comparative alternator will be explained with reference to FIGS. 5 and 6.

Figure 5:
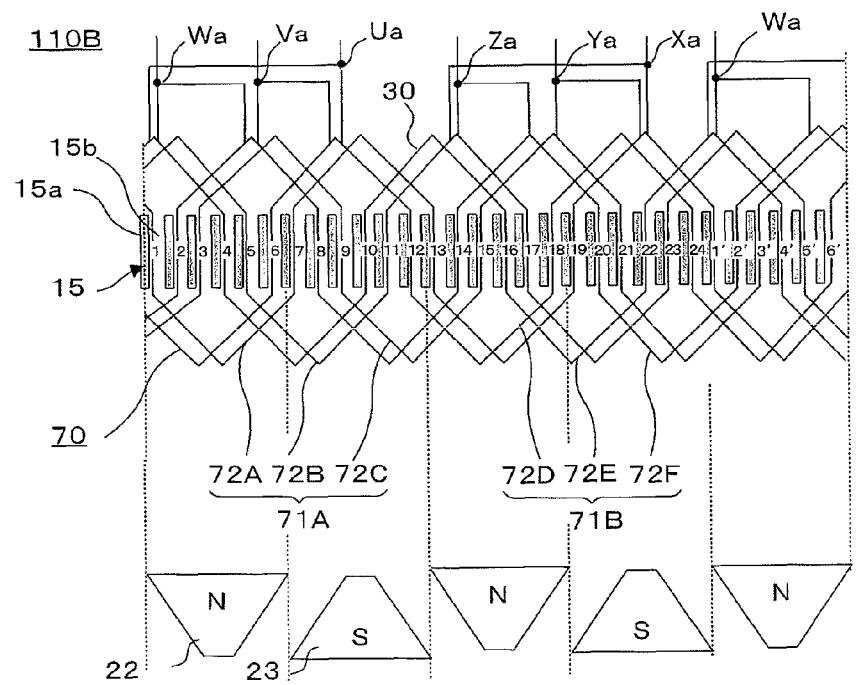
FIG. 5 is a developed projection that explains a configuration of an armature winding of a second comparative alternator.
Figure 6:
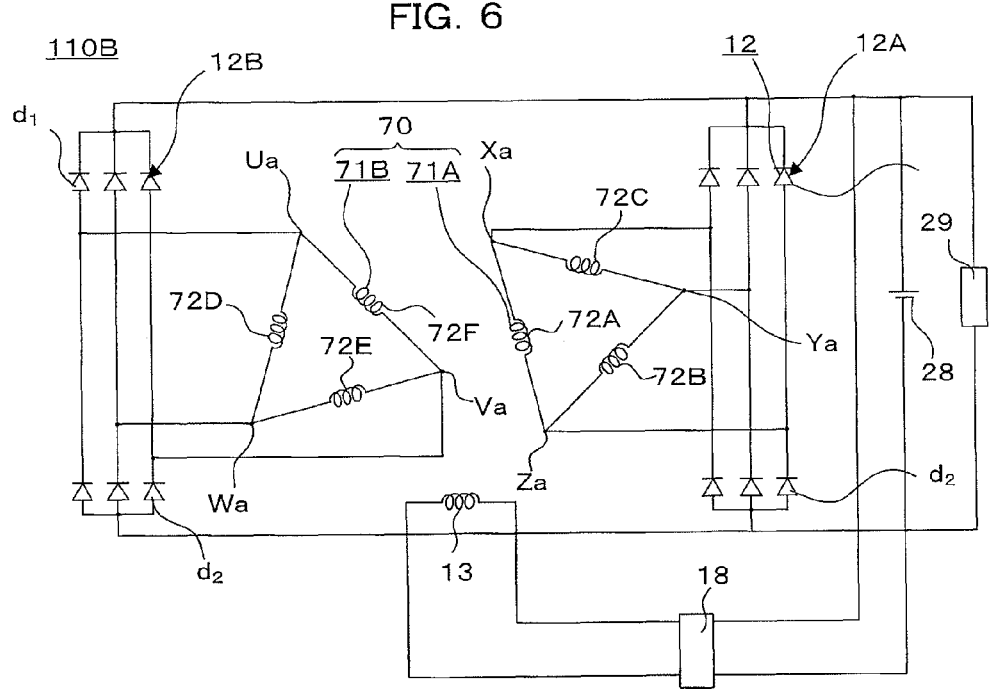
FIG. 6 is a circuit diagram of the second comparative alternator.

FIG. 5 is a developed projection that explains a configuration of an armature winding of the second comparative alternator, and FIG. 6 is a circuit diagram of the second comparative alternator.

Moreover, in FIGS. 5 and 6, portions identical to or corresponding to the configuration of the automotive alternator 100A will be given identical numbering, and explanation thereof will be omitted.

In FIGS. 5 and 6, an armature winding 70 of the second comparative alternator 110B is configured so as to have two three-phase alternating current windings 71A and 71B in which an a-phase winding 72A through c-phase winding 72C that have electrical angular phases that are offset by 120 degrees from each other are delta-connected, and phases between the three-phase alternating current windings 71A and 71B are offset by 30 degrees.

The three-phase alternating-current winding 71A is configured by delta-connecting three phase windings 72A through 72C that are constituted by respective conducting wires 30 that are mounted into a stator core 15 as full-pitch wave windings.

The three-phase alternating-current winding 71B is configured by delta-connecting three phase windings 72D through 72F that are constituted by respective conducting wires 30 that are mounted into the stator core 15 as full-pitch wave windings.

A winding construction of the armature winding 70 will now be explained with reference to FIG. 5.

First, the winding construction of the three-phase alternating-current winding 71A will be explained.

The a-phase winding 72A is mounted to the stator core 15 so as to pass through slots 15b that have identical numbers to the numbers of the slots 15b through which the coil winding portion 32a of the a-phase winding 32A of the automotive alternator 100A passes. Here, the a-phase winding 72A is mounted to the stator core 15 so as to be twice as long as the coil winding portion 32a, in other words, the a-phase winding 72A makes a total of six laps.

The b-phase winding 72B is mounted to the stator core 15 so as to pass through slots 15b that have identical numbers to the numbers of the slots 15b through which the coil winding portion 32c of the b-phase winding 32B of the automotive alternator 100A passes. Here, the b-phase winding 72B is mounted to the stator core 15 so as to make a total of six laps.

The c-phase winding 72C is mounted to the stator core 15 so as to pass through slots 15b that have identical numbers to the numbers of the slots 15b through which the coil winding portion 32e of the c-phase winding 32C of the automotive alternator 100A passes. Here, the c-phase winding 72C is mounted to the stator core 15 so as to make a total of six laps. The three-phase alternating-current winding 71A is configured by delta-connecting the a-phase winding 72A through c-phase winding 72C such that electrical angle phase differences between the a-phase winding 72A through c-phase winding 72C are 120 degrees.

Next, the winding construction of the three-phase alternating-current winding 71B will be explained.

The a-phase winding 72D through c-phase winding 72F are configured as if the a-phase winding 72A through c-phase winding 72C were mounted into the stator core 15 so as to be offset by eleven slots in a direction of progression of the numbers of the slots 15b. The three-phase alternating-current winding 71B is configured by delta-connecting the a-phase winding 72D through c-phase winding 72F such that phase differences between the a-phase winding 72D through c-phase winding 72F are 120 degrees. The electrical angle phase difference between the three-phase alternating-current windings 71A and 71B that are configured in this manner is 30 degrees.

The rest of the configuration of the second comparative alternator 110B is similar to that of the automotive alternator 100A.

Figure 7:
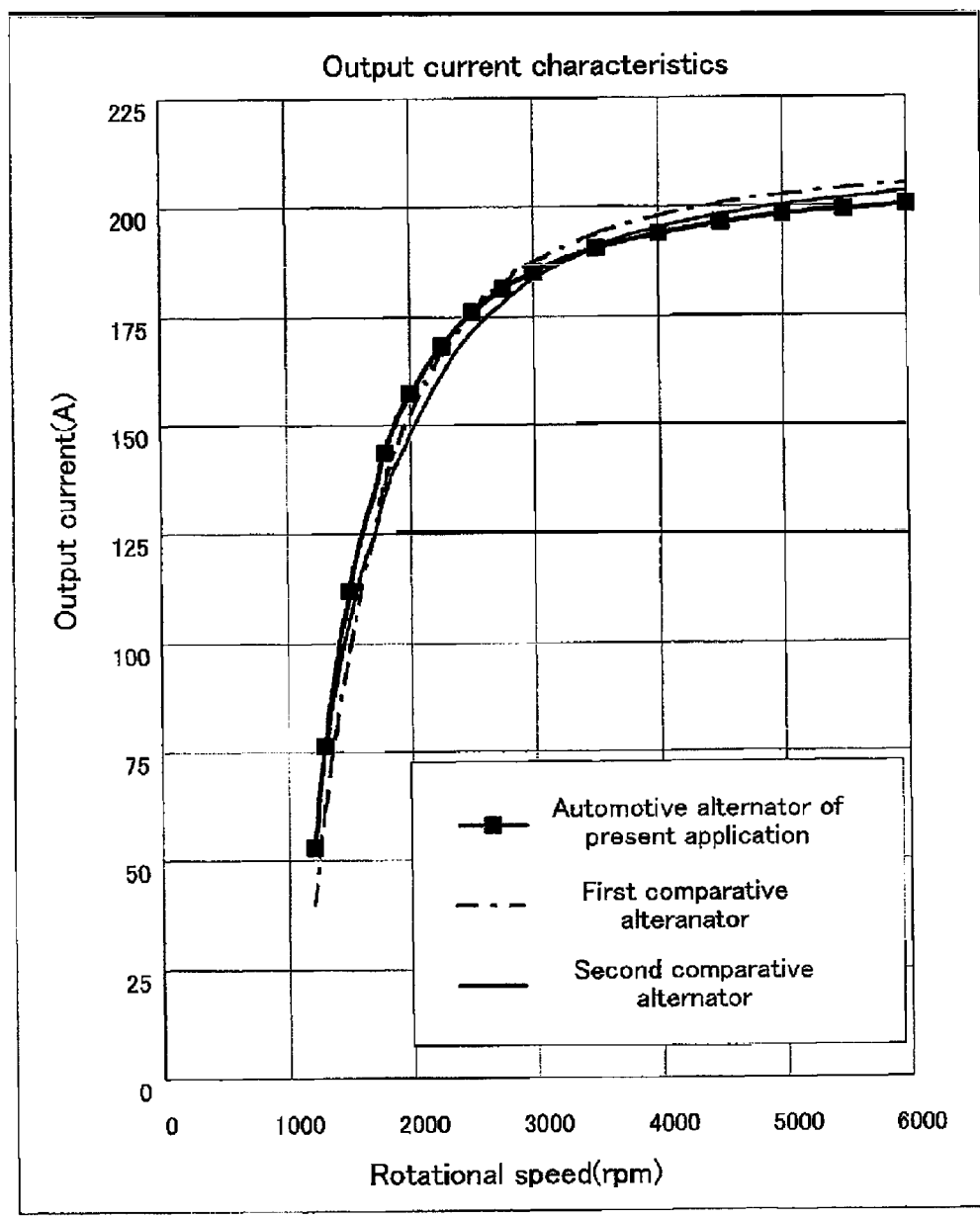
FIG. 7 is a graph that shows output current characteristics of respective rectifiers in the automotive alternator, the first comparative alternator, and the second comparative alternator.

Now, output currents from each of the generators were measured as the rotational speed of the rotor 7 was changed from 1,200 rpm to 6,000 rpm and the results are shown in FIG. 7.

FIG. 7 is a graph that shows output current characteristics of the respective rectifiers in the automotive alternator, the first comparative alternator, and the second comparative alternator.

In FIG. 7, rotational speed of the rotor 7 is on a horizontal axis, and output current is on a vertical axis.

Hereinafter, output current from the rectifier 12 of the automotive alternator, output current from the rectifier 12 of the first comparative alternator 110A, and output current from the rectifier 12 of the second comparative alternator 110B will simply be designated "output current from the automotive alternator 100A", "output current from the first comparative alternator 110A", and "output current from the second comparative alternator 110B", respectively.

The output characteristics of all of the generators increased at a predetermined gradient for each of the generators as the rotational speed of the rotor 7 increased in a region in which the rotational speed of the rotor 7 was 1,200 rpm to less than or equal to 2,000 rpm, the ratio of the amount of increase in the output current relative to the amount of increase in the rotational speed of the rotor 7 decreased gradually when the rotational speed of the rotor 7 exceeded 2,000 rpm, and finally was practically saturated when the rotational speed of the rotor 7 was greater than or equal to 4,000 rpm.

When the rotational speed of the rotor 7 was 1,200 rpm, the magnitudes of the output currents from the automotive alternator 100A and the second comparative alternator 110B were approximately equal, and the magnitude of the output current from the first comparative alternator 110A was smaller than the output current from the automotive alternator 100A and the second comparative alternator 110B by approximately 5 amperes (A). In the region in which the rotational speed of the rotor 7 was 1,200 through 2,000 rpm, the gradients of increase in output current from the automotive alternator 100A and the first comparative alternator were approximately equal, and the gradient of increase in output current from the second comparative alternator 110B was less than the gradients of increase in output current from the automotive alternator 100A and the first comparative alternator 110A.

As the rotational speed of the rotor 7 was increased from 1,200 rpm to 2,000 rpm, the difference between the output current from the automotive alternator 100A and the output current from the second comparative alternator 110B gradually widened, and when the rotational speed of the rotor 7 was 2,000 rpm, the output current from the automotive alternator 100A was approximately 8 A greater than the output current from the second comparative alternator.

When the rotational speed of the rotor 7 was from 1,200 rpm, the difference between output current from the first comparative alternator 110A and the output current from the second comparative alternator decreased gradually, and the output current from the first comparative alternator 110A became greater than the output current from the second comparative alternator 110B when the rotational speed of the rotor 7 was in a vicinity of 1,700 rpm.

The amount of increase in the output current from the automotive alternator 100A became smallest when the rotational speed of the rotor 7 was increased from 2,000 rpm to 4,000 rpm. The output current from the automotive alternator 100A became less than the output current from the first comparative alternator when the rotational speed of the rotor 7 was in a vicinity of 2,500 rpm, and became less than the output current from the second comparative alternator 110B when the rotational speed of the rotor 7 was in a vicinity of 3,500 rpm.

In a region in which the rotational speed of the rotor 7 was greater than or equal to 1,700 rpm, the output current from the first comparative alternator 110A progressed to ever greater values than the output current from the second comparative alternator 110B.

Now, as has been mentioned above, it is conventionally believed that in generators in which the first and second three-phase alternating-current windings are zigzag delta windings, as in the automotive alternator 100A and the first comparative alternator 110A, electromotive force is reduced when the rotor 7 rotates at low speed, and output current is increased when the rotor 7 rotates at high speed, compared with the second comparative alternator 110B in which the first and second three-phase alternating-current windings are normal delta windings in which the phase windings are configured without any phase offset.

In this experiment, the results showed that the output current from the first comparative alternator 110A was lower than that of the second comparative alternator 110B when the rotor 7 rotated at low speed, and the output current was greater than that of the second comparative alternator 110B when the rotor 7 rotated at high speed, as conventionally believed. Specifically, the output current from the first comparative alternator 110A was less than the output current from the second comparative alternator in a region in which the rotational speed of the rotor 7 was slower than approximately 1,600 rpm.

On the other hand, as a result of diligent effort, the present applicants have found that if first and second three-phase alternating-current windings 31A and 31B that are each constituted by a zigzag delta winding are mounted into a stator core 15 in such a way that their electrical angular phases differ by 30 degrees, a reverse phenomenon occurs to what is conventionally believed. In other words, results were obtained that showed that the output current from the automotive alternator 100A was greater than that of the second comparative alternator 110B when the rotor 7 rotated at low speed, and the output current was lower than that of the second comparative alternator 110B when the rotor 7 rotated at high speed. Specifically, in a region in which the rotational speed of the rotor 7 was slower than approximately 3,500 rpm, the output current from the automotive alternator 100A was greater than or equal to the output current from the second comparative alternator 110B.

Thus, in a region of a wide range of rotational speeds of the rotor 7 that includes 1,500 through 2,000 rpm, the output current from the automotive alternator 100A is greater than the output current from the first comparative alternator 110A and the second comparative alternator 100B. Vehicles in which the engine is in an idling state when the rotational speed of the rotor 7 is in a range from 1,500 through 2,000 rpm are becoming widely used. The above result means that the electric current output of the automotive alternator 100A is increased compared to the first comparative alternator 110A and the second comparative alternator 110B when the engine is in an idling state.

Next, the above results will be examined. The automotive alternator 100A is configured such that one of the conducting wires 30 that constitute the a-phase winding 32A through c-phase winding 32C of the first three-phase alternating-current winding 31A, and one of the conducting wires 30 that constitute the a-phase winding 32D through c-phase winding 32F of the second three-phase alternating-current winding 31B pass through each of the slots 15b. Here, because the two phase windings that are constituted by the two conducting wires 30 that pass through each of the slots 15b have an electrical angle phase difference between them, phases between the electric currents that flow through the two phase windings in question are offset. Thus, it can be considered that output current increases because harmonic currents that result from mutual inductance between the phase windings increase.

According to Embodiment 1, an automotive alternator 100A includes: a rotor 7 that has field poles; a stator 8 that includes: a stator core 15 in which slots that number six times the number of field poles are formed at a predetermined pitch circumferentially; and first and second three-phase alternating-current windings 31A and 31B that are each configured by delta-connecting three phase windings 32A through 32C (32D through 32F) that are wound into the stator core such that an electrical angle phase difference between each is 120 degrees; and a rectifier 12 that rectifies output current that is induced in the first and second three-phase alternating-current windings 31A and 31B in response to rotating magnetic fields generated by field poles of the rotor 7 by rotating synchronously with rotation of an engine. The phase windings 32A through c-phase winding 32F are configured by connecting in series respective pairs of coil winding portions that are mounted to the stator core 15 such that their electrical angular phases differ, and an electrical angle phase difference between the first and second three-phase alternating-current windings 31A and 31B is 30 degrees.

Output current from the rectifier 12 can thereby be increased in a region in which the rotor 7 rotates at low speed without increasing the number of turns in the phase windings 32A through 32C and 32D through 32F. In other words, resistance in the phase windings 32A through 32C and 32D through 32F is increased, enabling flattening of the storage battery 28 to be prevented while avoiding reductions in generating efficiency.

Moreover, in Embodiment 1 above, the pairs of coil winding portions that constitute each of the a-phase winding 32A through c-phase winding 32C and the a-phase winding 32D through c-phase winding 32F are explained as being connected in series so as to have an electrical angle phase difference of 30 degrees, but the pairs of coil winding portions are not limited to being connected in series with an electrical angle phase difference of 30 degrees, and the effects of the present application can also be achieved by connection in series with an electrical angle phase difference other than 30 degrees, if required.

Moreover, even if an existing second comparative alternator 110B is mounted to a vehicle, the second comparative alternator 110B can be converted to the configuration of the automotive alternator 100A simply by modifying connections on the three-phase alternating-current windings 71B and 71B provided that the pairs of coil winding portions that constitute the phase windings are set to have electrical angle phase differences of 30 degrees therebetween, and are wound onto the stator core 15 at a pitch that is equal to the pitch of the field poles (full-pitch windings).

The six coil winding portions 32a through 32f that constitute the first three-phase alternating-current winding 31A are each mounted into six different slot groups. The six coil winding portions 31g through 32l that constitute the second three-phase alternating-current winding 31B are also each mounted to different slot groups. The pairs of coil winding portions that respectively constitute the a-phase winding 32A through c-phase winding 32C that constitute the first three-phase alternating-current winding 31A are each mounted into slot groups into which are mounted one coil winding portion that constitutes one phase winding and one coil winding portion that constitutes another phase winding that constitute the second three-phase alternating-current winding 31B. Thus, it is surmised that harmonic currents between the phase windings that constitute the first and second three-phase alternating-current windings 31A and 31B increase, and further increases in output current from the rectifier 12 can be expected.

One of the conducting wires 30 that constitute the a-phase winding 32A through c-phase winding 32C of the first three-phase alternating-current winding 31A, and one of the conducting wires 30 that constitute the a-phase winding 32D through c-phase winding 32F of the second three-phase alternating-current winding 31B pass through each of the slots 15b, and phases of the electric currents that flow through the two phase windings that are constituted by the two conducting wires 30 that pass through each of the slots 15b are offset. Thus, whether it can be considered that output current from the automotive alternator 100A increases even when the rotor 7 is rotating at low speed because harmonic currents that result from mutual inductance between the phase windings increase was investigated.

Hereinafter, one of the conducting wires 30 that constitute the a-phase winding 32A through c-phase winding 32C of the first three-phase alternating-current winding 31A and one of the conducting wires 30 that constitute the a-phase winding 32D through c-phase winding 32F of the second three-phase alternating-current winding 31B shall be designated more concisely "pairs of conducting wires 30 that constitute the phase windings of different three-phase alternating-current windings".

However, even if pairs of conducting wires 30 that constitute the phase windings of different three-phase alternating-current windings do not pass through each of the slots, a certain amount of mutual inductance will arise between the phase winding if the electrical angular phase between the first and second three-phase alternating-current windings 31A and 31B differs. Consequently, effects are achieved that enable the output current to be increased in a low-speed rotation region of the rotor 7 even if pairs of conducting wires 30 that constitute the phase windings of different three-phase alternating-current windings do not pass through each of the slots 15b provided that the first and second three-phase alternating-current windings 31A and 31B are constituted by zigzag delta windings, and the electrical angular phase between each differs.

However, if pairs of conducting wires 30 that constitute the phase windings of different three-phase alternating-current windings are inserted through each of the slots 15b, effects are achieved that enable the output current to be increased more significantly.

Because the number of turns in each of the coil winding portions 32a and 32b, 32c and 32d, etc, through 32k and 32l that are connected in series are equal, the coil winding portions 32a through 32l are not concentrated at particular places on coil ends, improving windability of the coil winding portions 32a through 32l.

Each of the coil winding portions 32a through 32f is explained as being configured by mounting a conducting wire 30 into the stator core 15 in a full-pitch wave winding so as to make three laps of the stator core 15, but may also be mounted to the stator core 15 so as to make one lap, two laps or four or more laps.

The coil winding portions 32a through 32f are explained as being configured by mounting a conducting wire 30 into the stator core 15 in a full-pitch wave winding, but the coil winding portions 32a through 32f may also be configured by mounting a conducting wire 30 into the stator core 15 in a lap winding of full-pitch windings.

Embodiment 2

Figure 8:
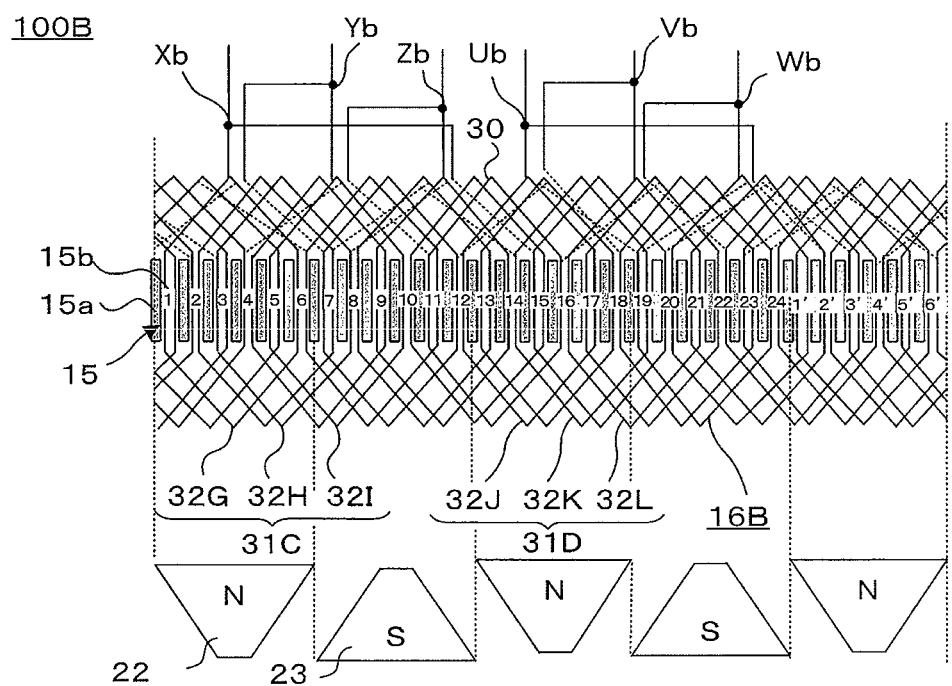
FIG. 8 is a developed projection that explains a configuration of an armature winding in an automotive alternator according to Embodiment 2 of the present invention.

FIG. 8 is a developed projection that explains a configuration of an armature winding in a dynamoelectric machine according to Embodiment 2 of the present invention.

In FIG. 8, an armature winding 16B of an automotive alternator 100B is constituted by first and second three-phase alternating-current windings 31C and 31D that are mounted to a stator core 15 such that electrical angular phases differ by 30 degrees therebetween.

The first three-phase alternating-current winding 31C has three phase windings (an a-phase winding 32G through c-phase winding 32I) that are each configured by mounting a conducting wire 30 into the stator core 15 in a lap winding of short-pitch windings that have a pitch of 5/6 field pole, and is configured by delta-connecting the phase windings 32G through 32I such that an electrical angle phase difference therebetween is 120 degrees.

The second three-phase alternating-current winding 31D has three phase windings (an a-phase winding 32J through c-phase winding 32L) that are each configured by mounting a conducting wire 30 into the stator core 15 in a lap winding of short-pitch windings that have a pitch of 5/6 field pole, and is configured by delta-connecting the phase windings 32J through 32L such that an electrical angle phase difference therebetween is 120 degrees.

Moreover, the a-phase through c-phase windings 32G through 32I, and 32J through 32L are configured by mounting conducting wires 30 into the stator core 15 as short-pitch windings as will be explained below.

A winding construction of the armature winding 16B will now be explained.

First, the winding construction of the first three-phase alternating-current winding 31C will be explained.

The conducting wire 30 of the a-phase winding 32G passes from the rear end of the stator core 15 through the slot 15b at Number 1, extends outward at the front end, and is then passed across to the slot 15b at Number 6, which is separated by five slots from the slot 15b at Number 1, passes through the slot 15b at Number 6, and extends outward at the rear end. Thereafter, the conducting wire 30 is wound so as to pass through the slots 15b at Numbers 1 and 6 in a similar manner for a predetermined number of turns.

In addition, an end of the conducting wire 30 that projects outward from the slot 15b at Number 6 is passed across to the slot 15b at Number 24, which is separated by six slots from the slot 15b at Number 6. The conducting wire 30 is passed from the rear end through the slot 15b at Number 24, extends outward at the front end, and is next passed across to the slot 15b at Number 19, which is separated by five slots from the slot 15b at Number 24, is passed from the front end through the slot 15b at Number 19, and extends outward at the rear end. Thereafter, the conducting wire 30 is wound so as to pass through the slots 15b at Numbers 24 and 19 in a similar manner for a predetermined number of turns.

In addition, an end of the conducting wire 30 that projects outward from the slot 15b at Number 19 is passed across to the slot 15b at Number 13, which is separated by six slots from the slot 15b at Number 19. The conducting wire 30 is passed from the rear end through the slot 15b at Number 13, extends outward at the front end, and is next passed across to the slot 15b at Number 18, which is separated by five slots from the slot 15b at Number 13, is passed from the front end through the slot 15b at Number 18, and extends outward at the rear end. Thereafter, the conducting wire 30 is wound so as to pass through the slots 15b at Numbers 13 and 18 in a similar manner for a predetermined number of turns.

In addition, an end of the conducting wire 30 that projects outward from the slot 15b at Number 18 is passed across to the slot 15b at Number 12, which is separated by six slots from the slot 15b at Number 18. The conducting wire 30 is passed from the rear end through the slot 15b at Number 12, extends outward at the front end, and is next passed across to the slot 15b at Number 7, which is separated by five slots from the slot 15b at Number 12, is passed from the front end through the slot 15b at Number 7, and extends outward at the rear end. Thereafter, the conducting wire 30 is wound so as to pass through the slots 15b at Numbers 12 and 7 in a similar manner for a predetermined number of turns, and an end portion of the wound conducting wire 30 is extended outward from the rear end of the slot 15b at Number 7.

The b-phase winding 32H is configured by winding a conducting wire 30 annularly for a predetermined number of turns so as to pass through the slots 15b at Numbers 9 and 14, and then winding it annularly for a predetermined number of turns so as to pass through the slots 15b at Numbers 8 and 3, and then winding it annularly for a predetermined number of turns so as to pass through the slots 15b at Numbers 21 and 2, and finally winding it annularly for a predetermined number of turns so as to pass through the slots 15b at Numbers 20 and 15. Here, the conducting wire 30 of the b-phase winding 32H is identical to a case in which the conducting wire 30 of the a-phase winding 32G is mounted to the stator core 15 so as to be offset by eight slots in a direction of progression of the numbers of the slots 15b.

The c-phase winding 32I is configured by winding a conducting wire 30 annularly for a predetermined number of turns so as to pass through the slots 15b at Numbers 5 and 10, and then winding it annularly for a predetermined number of turns so as to pass through the slots 15b at Numbers 4 and 23, and then winding it annularly for a predetermined number of turns so as to pass through the slots 15b at Numbers 17 and 22, and finally winding it annularly for a predetermined number of turns so as to pass through the slots 15b at Numbers 16 and 11. Here, the conducting wire 30 of the c-phase winding 32I is identical to a case in which the conducting wire 30 of the a-phase winding 32G is mounted to the stator core 15 so as to be offset by four slots in a direction of progression of the numbers of the slots 15b.

The first three-phase alternating-current winding 31C is constituted by a delta connection in which are connected an end portion of the a-phase winding 32G near the slot 15b at Number 1 and an end portion of the b-phase winding 32H near the slot 15b at Number 15, an end portion of the a-phase winding 32G near the slot 15b at Number 7 and an end portion of the c-phase winding 32I near the slot 15b at Number 5, and an end portion of the b-phase winding 32H near the slot 15b at Number 9 and an end portion of the c-phase winding 32I near the slot 15b at Number 11.

Moreover, connection wiring portions Xb through Zb of different phase windings of the first three-phase alternating-current winding 31C are connected to respective connecting portions between positive-side diodes $d_1$ and negative-side diodes $d_2$ of a three-phase full-wave rectifier 12A (not shown).

Next, the winding construction of the second three-phase alternating-current winding 31D will be explained.

The conductor wires 30 of the a-phase winding 22J through c-phase winding 32L of the second three-phase alternating-current winding 31D are configured as if the a-phase winding 72G through c-phase winding 32I were mounted into the stator core 15 so as to be offset by eleven slots in a direction of progression of the numbers of the slots 15b.

Thus, the electrical angle phase difference between the first and second three-phase alternating-current windings 31C and 31D is 30 degrees.

Although not shown in detail, connection wiring portions Ub through Wb of different phase windings of the second three-phase alternating-current winding 31D are each connected to respective connecting portions between positive-side diodes $d_1$ and negative-side diodes $d_2$ of a three-phase full-wave rectifier 12B (not shown).

Now, let us consider the fact that the a-phase winding 32G of the first three-phase alternating-current winding 31C is mounted to the stator core 15 in a short-pitch winding that has a pole pitch of 5/6 using the slots 15b at Numbers 1, 6, 7, 12, 13, 18, 19, and 24.

Let us also consider the fact that the coil winding portions 32a and 32b of the a-phase winding 32A of the first three-phase alternating-current winding 31A of the automotive alternator 100A are mounted using the slots 15b at Numbers 1, 7, 12, 13, 18, 19, and 24.

When the automotive alternators 100A and 100B are compared, the a-phase winding 32G and the a-phase winding 32A, which are mounted using the slots 15b at similar numbers, are electromagnetically equivalent. In other words, when the rotors 7 of each of the automotive alternators 100A and 100B rotate, the alternating-current output currents that are induced by the rotating magnetic fields from the field poles, and the magnetic fields generated by the electric currents that flow into the respective a-phase windings 32G and 32A are equal.

Similarly, the b-phase winding 32H and the c-phase winding 32I of the first three-phase alternating-current winding 31C are mounted into the stator core 15 using slots 15b that have similar numbers to the numbers of the slots 15b that the b-phase winding 32B and the c-phase winding 32C of the first three-phase alternating-current winding 31A of the automotive alternator 100A pass through, and the b-phase and c-phase windings 32H and 32I and the b-phase and c-phase windings 32B and 32C are electromagnetically equivalent.

The a-phase winding 32J through c-phase winding 32L of the second three-phase alternating-current winding 31D are also mounted into the stator core 15 using slots 15b that have similar numbers to the numbers of the slots 15b that the a-phase winding 32D through c-phase winding 32F of the second three-phase alternating-current winding 31B of the automotive alternator 100A pass through, and the a-phase winding 32J through c-phase winding 32L and the a-phase winding 32D through c-phase winding 32F are electromagnetically equivalent. In other words, the armature winding 16B is electromagnetically equivalent to the armature winding 16A.

Consequently, according to the automotive alternator 100B, output from the rectifier 12 can be increased compared to the output current from the conventional alternators when the rotor 7 rotates at low speed, in a similar manner to the automotive alternator 100A.

In addition, by making the phase windings 32G through 32L in the automotive alternator 100B short-pitch windings, coil end dimensions can be shortened, thereby enabling winding resistance of the phase windings 32G through 32L to be reduced.

Moreover, in Embodiment 2 above, the phase windings 32G through 32L are explained as being configured by mounting conducting wires 30 into the stator core 15 as lap windings of short-pitch windings, but the phase windings 32G through 32L may also be configured by mounting conducting wires into the stator core 15 as wave windings of short-pitch windings.

In each of the above embodiments, automotive alternators 100A and 100B were explained in which the number of field poles was four and the number of the slots 15b was twenty-four to facilitate explanation. However, the field poles and the slots 15b are not limited to particular numbers and should be appropriately set according to need, provided that the number of field poles is 2n (where, n is a positive integer) and the number of slots 15b satisfies 2n×6.

In each of the above embodiments, automotive alternators 100A and 100B were explained as examples of dynamoelectric machines, but the present invention can also be applied to other dynamoelectric machines such as alternating-current motors that have a rotor, a stator, and a rectifier in a similar configuration to the rotor 7, the stator 8, and the rectifier 12.

In each of the above embodiments, the conducting wires 30 are explained as being prepared using a copper wire that has a circular cross section that has been coated with an insulator, but the conducting wire is not limited in this, and may also have another cross-sectional shape such as a rectangular cross section, or may also be prepared using a metal material other than copper, for example.

What is claimed is:

1. A dynamoelectric machine comprising:
a rotor that has 2n field poles, where n is a positive integer;
a stator comprising:
    a stator core in which 2n×6 slots that are partitioned by adjacent teeth are formed at a predetermined pitch circumferentially; and
    first and second three-phase alternating-current windings that are each configured by delta-connecting three phase windings that are mounted to said stator core such that an electrical angle phase difference therebetween is 120 degrees; and
a rectifier that rectifies alternating-current output that is induced in said first and second three-phase alternating-current windings due to rotation of said rotor, wherein:
each of said phase windings is configured by connecting in series pairs of coil winding portions that are mounted to said stator core so as to have different electrical angular phases from each other; and
an electrical angle phase difference between said first and second three-phase alternating-current windings is 30 degrees.

2. A dynamoelectric machine according to claim 1, wherein:
six of said coil winding portions that constitute said first three-phase alternating-current winding are respectively mounted into different slot groups;

six of said coil winding portions that constitute said second three-phase alternating-current winding are respectively mounted into different slot groups; and said pairs of coil winding portions that constitute each of said phase windings that constitute said first three-phase alternating-current winding are respectively mounted into said slot groups into which are mounted one of said coil winding portions that constitutes one of said phase windings that constitute said second three-phase alternating-current winding and one of said coil winding portions that constitutes another of said phase windings that constitute said second three-phase alternating-current winding.

3. A dynamoelectric machine according to claim 1, wherein each of said coil winding portions is mounted into said stator core at a pitch that is equal to a pitch of said field poles, and an electrical angle phase difference between said pairs of coil winding portions that are connected in series is 30 degrees.

4. A dynamoelectric machine according to claim 1, wherein each of said coil winding portions that are connected in series have an equal number or turns.

5. A dynamoelectric machine according to claim 1, wherein one conducting wire that constitutes said three phase windings of said first three-phase alternating-current winding and one conducting wire that constitutes said three phase windings of said second three-phase alternating-current winding is inserted through each of said slots.

6. A dynamoelectric machine comprising:

a rotor that has 2n field poles, where n is a positive integer;

a stator comprising:
   a stator core in which 2n×6 slots that are partitioned by adjacent teeth are formed at a predetermined pitch circumferentially; and
   first and second three-phase alternating-current windings that each have three phase windings, and are configured by delta-connecting said three phase windings such that an electrical angle phase difference therebetween is 120 degrees; and a rectifier that rectifies alternating-current output that is induced in said first and second three-phase alternating-current windings due to rotation of said rotor, wherein:

each of said three phase windings is mounted into said stator core as a short-pitch winding that has a pitch of 5/6 field pole; and an electrical angle phase difference between said first and second three-phase alternating-current windings is 30 degrees.

7. A dynamoelectric machine according to claim 6 wherein one conducting wire that constitutes said three phase windings of said first three-phase alternating-current winding and one conducting wire that constitutes said three phase windings of said second three-phase alternating-current winding is inserted through each of said slots.

* * * * *